United States Patent [19]
Tanaka et al.

[11] Patent Number: 4,638,162
[45] Date of Patent: Jan. 20, 1987

[54] METHOD OF ADJUSTING RADIATION IMAGE READ-OUT CONDITION

[75] Inventors: Hirosi Tanaka; Tokukazu Saito, both of Kanagawa, Japan

[73] Assignee: Fuji Photo Film Co., Ltd., Japan

[21] Appl. No.: 708,767

[22] Filed: Mar. 5, 1985

[30] Foreign Application Priority Data

Mar. 5, 1984 [JP] Japan .................................. 59-42260

[51] Int. Cl.$^4$ ............................................. G01T 1/105
[52] U.S. Cl. ............................... 250/327.2; 250/484.1; 364/414
[58] Field of Search ......................... 250/327.2, 484.1; 364/414

[56] References Cited

U.S. PATENT DOCUMENTS

| | | | |
|---|---|---|---|
| 4,091,416 | 5/1978 | Riethmuller et al. | 358/111 |
| 4,258,264 | 3/1981 | Kotera et al. | 250/484.1 |
| 4,276,473 | 6/1981 | Kato et al. | 250/327.2 |
| 4,302,672 | 11/1981 | Kato et al. | 250/327.2 |
| 4,310,886 | 1/1982 | Kato et al. | 364/414 |
| 4,496,973 | 1/1985 | Horikawa et al. | 358/111 |

OTHER PUBLICATIONS

Richard N. Sutton and Ernest L. Hall, "Texture Measures for Automatic Classification of Pulmonary Disease", *IEEE Transactions on Computers*, vol. C-21, No. 7, (Jul. 1972), pp. 667-676.

*Primary Examiner*—Carolyn E. Fields
*Assistant Examiner*—Constantine Hannaher
*Attorney, Agent, or Firm*—Sughrue, Mion, Zinn, Macpeak, and Seas

[57] ABSTRACT

A method of adjusting radiation image read-out conditions used in a radiation image recording and reproducing system wherein preliminary read-out and final read-out are conducted for detecting the radiation image stored in a stimulable phosphor sheet comprises the step of determining a histogram of the amount of light emitted by the stimulable phosphor sheet when it is exposed to stimulating rays during the preliminary read-out. Read-out conditions are adjusted on the basis of a histogram section ranging from the maximum light emission amount in the histogram to a value determined by image recording conditions.

8 Claims, 4 Drawing Figures

METHOD OF ADJUSTING RADIATION IMAGE READ-OUT CONDITION

BACKGROUND OF THE INVENTION

1. Field of the Invention

This invention relates to a method of adjusting radiation image read-out conditions used in a radiation image recording and reproducing system. This invention particularly relates to a method of adjusting the final read-out conditions on the basis of image information obtained by preliminary read-out in a radiation image recording and reproducing system wherein the preliminary read-out and the final read-out are carried out.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored therein, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic light-sensitive material or on a display device such as a cathode ray tube (CRT).

One embodiment of the aforesaid radiation image recording and reproducing system is disclosed, for example, in Japanese Unexamined Patent Publication No. 58(1983)-67240. In the embodiment, before final read-out is conducted by scanning the stimulable phosphor sheet carrying a radiation image of an object stored therein by stimulating rays which cause the stimulable phosphor sheet to emit light in proportion to the radiation energy stored, several steps are carried out. The emitted light is detected by a photoelectric read-out means and converted into an electric image signal. These steps produce a preliminary read-out for approximately detecting the image information stored in the stimulable phosphor sheet by use of stimulating rays of a level lower than the level of the stimulating rays used in the final read-out. Read-out conditions for the final read-out are adjusted on the basis of the information obtained by the preliminary read-out, and the final read-out is conducted by use of the read-out conditions. The electric image signal obtained by the final read-out is sent to an image processing means and is processed in accordance with the image recording portion of the object and/or the image recording method to obtain a visible image suitable for viewing, particularly for diagnostic purposes. The processed image signal is used to reproduce the visible image on a photographic film or the like.

As described above, the level of the stimulating rays used in the preliminary read-out is lower than the level of the stimulating rays used in the final read-out. That is, the effective energy of the stimulating rays which the stimulable phosphor sheet receives per unit area in the preliminary read-out should be lower than the effective energy of the stimulating rays used in the final read-out. In order to make the level of the stimulating rays used in the preliminary read-out lower than the level of the stimulating rays in the final read-out, the output of the stimulating ray source such as a laser beam source may be decreased in the preliminary read-out, or the stimulating rays emitted by the stimulating ray source may be attenuated by an ND filter, an AOM, or the like positioned on the optical path. Alternatively, a stimulating ray source for the preliminary read-out may be positioned independently of the stimulating ray source for the final read-out, and the output of the former may be made lower than the output of the latter. Or, the beam diameter of the stimulating rays may be increased, the scanning speed of the stimulating rays may be increased, or the moving speed of the stimulable phosphor sheet may be increased in the preliminary read-out.

When the image information stored in the stimulable phosphor sheet is approximately determined prior to the final read-out and the final read-out is conducted by use of the read-out conditions adjusted on the basis of the image information, it becomes possible to eliminate adverse effects of a fluctuation in the level of the radiation energy stored in the stimulable phosphor sheet, which is caused by a change in the object or the image recording portion thereof, by a fluctuation in the radiation dose, or the like, and to conduct the final read-out by use of desirable read-out conditions.

Various methods may be used as the preliminary read-out for approximately determining the image information prior to the final read-out and adjusting the read-out conditions. One method is to carry out preliminary read-out by scanning the stimulable phosphor sheet by stimulating rays of a low level and detecting the light emitted by the sheet during the scanning, to determine a histogram of the amount of emitted light, and to adjust the read-out conditions on the basis of the histogram.

In U.S. patent application No. 695,332, the applicant proposed a novel method of adjusting the read-out conditions on the basis of the histogram. The method comprises the steps of: calculating the maximum light emission amount Smax and the minimum light emission amount Smin of a desired image information range in the histogram, and adjusting the read-out conditions so that the maximum light emission amount Smax and the minimum light emission amount Smin correspond respectively to the maximum signal level Qmax and the minimum signal level Qmin of a desired input signal range in the image processing means which are determined by the maximum density Dmax and the minimum density Dmin of a correct density range in the reproduced visible image.

However, the histogram of the light emission amount obtained by the preliminary read-out (hereinafter referred to as the preliminary read-out histogram) often includes noise generated by various causes. For example, when a region unexposed to X-rays is present on the stimulable phosphor sheet, it has been assumed that the unexposed region does not emit light when exposed to stimulating rays. Actually, however the unexposed region stores energy of scattered X-rays and emits light in some amount when exposed to stimulating rays. In this case, the preliminary read-out histogram obtained includes noise caused by the scattered X-rays.

As, therefore, the preliminary read-out histogram often includes noise, in the method of directly adjusting the read-out conditions on the basis of the preliminary read-out histogram without pre-processing the histogram, it is not always possible to determine Smax and Smin accurately and consistently and to adjust the read-out conditions accurately and consistently.

SUMMARY OF THE INVENTION

The primary object of the present invention is to provide a method for consistently adjusting radiation image read-out conditions to appropriate values.

Another object of the present invention is to provide a method of adjusting radiation image read-out conditions wherein noise components are eliminated from a preliminary read-out histogram by carrying out a pre-processing of the preliminary read-out histogram and read-out conditions are consistently adjusted to appropriate values on the basis of a true histogram of the light emission amount or a histogram approximately identical with the true histogram.

The method of adjusting radiation image read-out conditions in accordance with the present invention is characterized by, instead of adjusting the read-out conditions directly on the basis of the preliminary read-out histogram, adjusting the read-out conditions on the basis of a section of the preliminary read-out histogram, i.e. the histogram section ranging from the maximum light emission amount to a lower value determined by the image recording conditions. The lower value is smaller than the maximum light emission amount by a few orders of magnitude, normally two or three orders of magnitude. An order of magnitude is a multiplicative factor often, that is, the histogram section lies within the range of a width determined by the image recording conditions from the maximum light emission amount toward the minimum light emission amount.

By the term "read-out conditions" as used herein are meant various conditions affecting the relationship between the amount of the light emitted by the stimulable phosphor sheet at the read-out step and the output of the read-out apparatus, for example, the read-out gain determining the relationship between the input and the output of the read-out apparatus, the scale factor, and the power of the stimulating rays used for read-out.

By the "image recording conditions" are meant the conditions characterizing the image recording, such as the image recording portion and the image recording method. By "image recording portion" is meant the portion of the object whose image is recorded, for example, the head, the chest, or the abdomen. The "image recording method" refers to the selection of plain image recording, contrasted image recording, tomography, enlargement image recording, or the like.

The method of adjusting the read-out conditions embraces the case where the read-out conditions are adjusted on the basis of only the aforesaid histogram section and the case where the read-out conditions are adjusted by considering the image recording portion, the image recording method, and the like in addition to the aforesaid histogram section.

In the method of the present invention, since the read-out conditions are adjusted on the basis of the histogram section ranging from the maximum amount of light emitted by the stimulable phosphor sheet to a value determined by the image recording conditions in the preliminary read-out histogram, it is possible to consistently adjust the read-out conditions to appropriate values on the basis of the true histogram of light emission amount free from noise or the histogram section approximately identical with the true histogram.

FIGS. 1 and 2 shows examples of the preliminary read-out histogram including noise. As shown in FIG. 1, when the whole surface of the stimulable phosphor sheet is not completely exposed to X-rays or when a region exposed to X-rays and a region unexposed thereto are present on the stimulable phosphor sheet, the histogram of the distribution of occurence of light emission amount as a function of the light emission amount directly obtained by the preliminary read-out (i.e. the preliminary read-out histogram) comprises a histogram section A at the region exposed to X-rays (main histogram section) and a histogram section B at the region unexposed to X-rays (scattered X-ray histogram section). In many cases, the histogram sections A and B partially overlap as shown.

However, experiments conducted by the inventors revealed that the latitude (width) of the main histogram section A is approximately the same under the same image recording conditions. It was also found that the scattered X-ray histogram section B is positioned on the minimum light emission amount side of the main histogram section A.

Therefore, the read-out conditions are adjusted on the basis of the histogram section ranging from the maximum light emission amount S1 in the preliminary read-out histogram, which coincides with the maximum light emission amount of the main histogram section A, to a predetermined value corresponding to the width of the main histogram section A determined by the image recording conditions. Namely, the read-out conditions are adjusted on the basis of only the main histogram section A nearly excluding the scattered X-ray histogram section B or on the basis of a histogram section approximately identical with the main histogram section A. Accordingly, it is possible to consistently adjust the read-out conditions to appropriate values.

As shown in FIG. 2, a noise component C generated by a cause other than scattered X-rays such as, for example, the apparatus, also appears on the minimum light emission amount side of the main histogram section A. Therefore, in the method of the present invention, it is possible to eliminate apparatus noise or the like together with scattered X-ray noise and to consistently adjust the read-out conditions to appropriate values on the basis of the main histogram section A or the histogram section approximately identical with the main histogram section A.

DESCRIPTION OF THE PREFERRED EMBODIMENTS

The present invention will hereinbelow be described in further detail with reference to the accompanying drawings.

Figure 1:
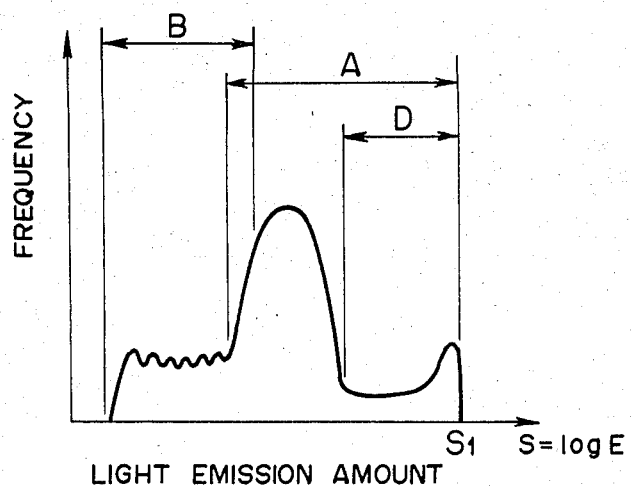
FIGS. 1, 2 and 3 are graphs showing examples of the preliminary read-out histograms including noise.
Figure 2:
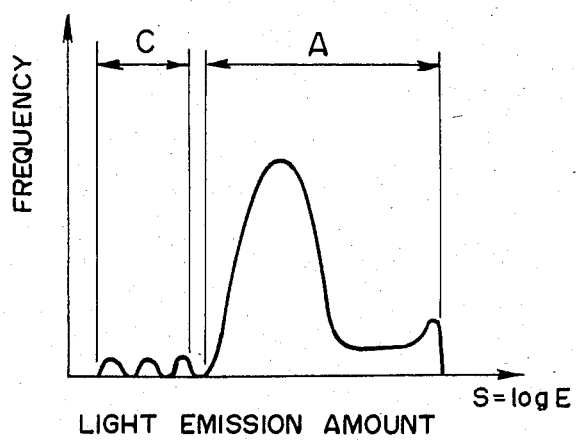

In one embodiment of the method of adjusting radiation image read-out conditions in accordance with the present invention, a preliminary read-out histogram as shown in FIG. 1 is obtained by the preliminary read-out, and the read-out conditions are adjusted on the basis of the histogram section A ranging from the maximum light emission amount S1 in the histogram to a light emission amount determined by the image recording conditions.

Figure 3:
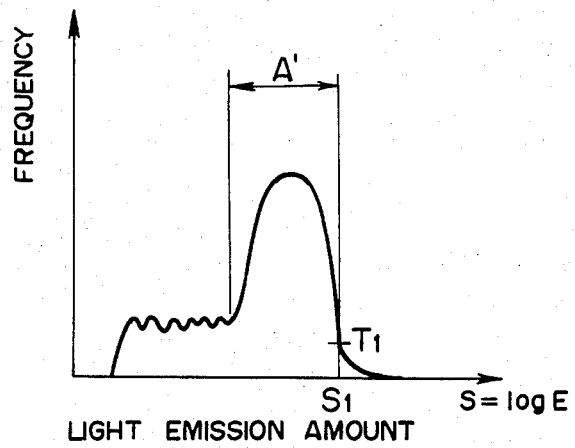

In FIG. 1, the section D denotes the skin portion of the object. As shown in FIG. 3, when no skin portion is present in the main histogram section, it is possible to use a value determined by a predetermined threshold value T1 as the maximum light emission amount S1 in the preliminary read-out histogram, and to adjust the read-out conditions on the basis of a histogram section A' ranging from S1 to a value determined by the image recording conditions.

Examples of the light emission amount determined by the image recording conditions will be described below.

It was found that, in the case of chest image recording, the main histogram section is present within the range from the maximum light emission amount in the preliminary read-out histogram to approximately 1/300 of the maximum light emission amount (a value smaller than the maximum light emission amount by approximately 2.5 orders of magnitude). Therefore, in the case of chest image recording, the read-out conditions may be adjusted by use of the histogram section ranging from the maximum light emission amount in the preliminary read-out histogram to 1/300 of the maximum light emission amount.

In the case of abdomen image recording, it was found that the main histogram section is present within the range from the maximum light emission amount in the preliminary read-out histogram to approximately 1/1,000 of the maximum light emission amount (a value smaller than the maximum light emission amount by 3 orders of magnitude). Therefore, in the case of abdomen image recording, the read-out conditions may be adjusted on the basis of the histogram section ranging from the maximum light emission amount in the preliminary read-out histogram to 1/1,000 of the maximum light emission amount.

In the abdomen case including no skin portion, it was found that the main histogram section is present within the range from the maximum light emission amount in the preliminary read-out histogram (the maximum value determined by the aforesaid predetermined threshold value) to approximately 1/100 of the maximum light emission amount (a value smaller than the maximum light emission amount by 2 order of magnitude). Therefore, in the case of abdomen image recording where an image of the skin portion is not included, the read-out conditions may be adjusted on the basis of the histogram section ranging from the maximum light emission amount in the preliminary read-out histogram to 1/100 of the maximum light emission amount. In this case, the threshold value should preferably be approximately 0.1% to approximately 2.0% of the number of picture elements of the image.

In the method of the present invention, the read-out conditions are adjusted on the basis of the histogram section corresponding to the main histogram section determined as described above. The method may be embodied in various manners, for example, by calculating Smax and Smin as described above and adjusting the read-out conditions on the basis of Smax and Smin as described below.

Figure 4:
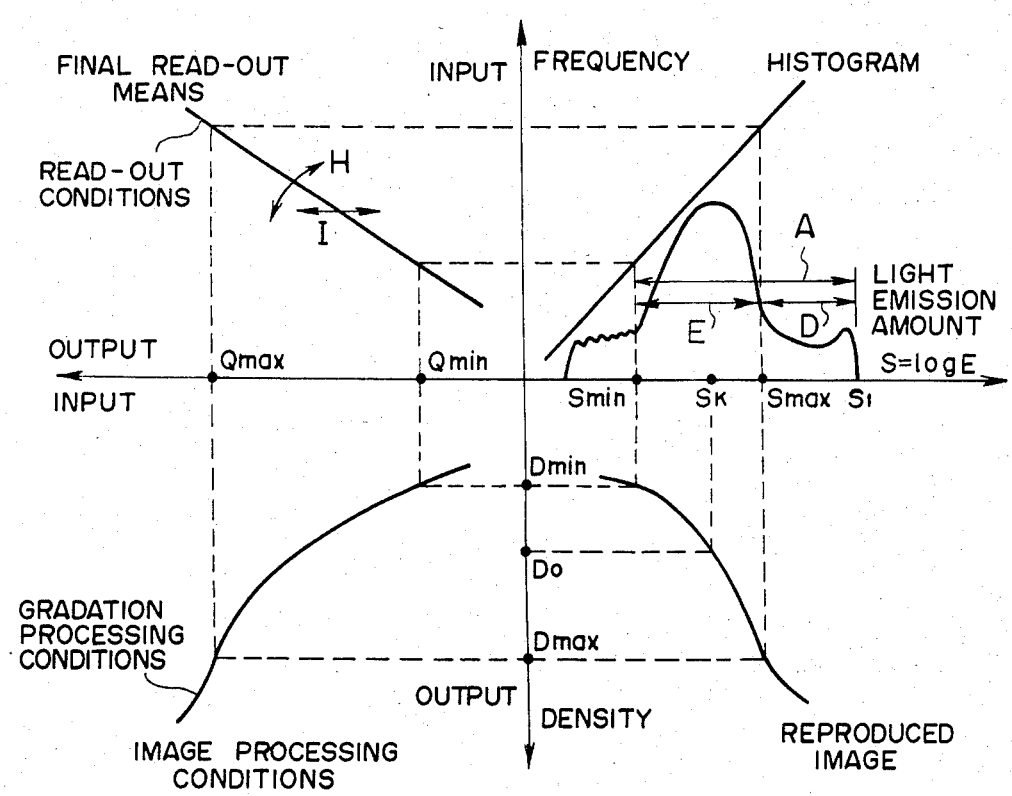
FIG. 4 is a graph showing the relationship between the histogram and the reproduced image.

First, from the preliminary read-out histogram as shown in the first quadrant of FIG. 4, the histogram section A ranging from the maximum light emission amount S1 to a predetermined value is determined as described above. Further, from the histogram section A, the maximum light emission amount Smax and the minimum light emission amount Smin of a desired image information range (range of the amount of light emitted by the stimulable phosphor sheet) are calculated. Since the pattern of the histogram is fixed to some extent by the image recording portion and the image recording method, the desired image information range may be determined from the histogram with reference to the image recording portion and the image recording method. For example, in the case of the preliminary read-out histogram as shown in FIG. 4, when the section D denotes the skin portion and the information on the section D is unnecessary, the desired image information range becomes the remaining section E, and the maximum light emission amount and the minimum light emission amount of the section E may be used as Smax and Smin. Of course, it is also possible to use the maximum light emission amount and the minimum light emission amount of the histogram section A as Smax and Smin. In other cases, a threshold value should preferably be determined in accordance with the desired image information range and Smax and Smin should be determined by the threshold value.

As described above, in the radiation image recording and reproducing system wherein the method of the present invention may be used, an electric image signal is obtained from the light emitted by the stimulable phosphor sheet by use of the read-out conditions with the final read-out means, and is subjected to various signal processings in the image processing means, particularly the gradation processing which is conducted by use of the gradation processing conditions determined in accordance with the image recording portion and/or image recording method. The processed signal is used to reproduce a visible image on a photographic film or the like. The reproduced visible image should have a correct density range suitable for viewing, particularly for diagnostic purposes. In general, the correct density range (Dmax to Dmin) is determined in advance. Desired gradation processing conditions are also determined in advance. Therefore, the range of signal level (Qmax to Qmin) which should be sent to the image processing means to obtain the correct density range (Dmax to Dmin) is fixed by the gradation processing conditions. FIG. 4 shows the relationship between the amount of light emitted by the stimulable phosphor sheet and the density of the reproduced visible image in the radiation image recording and reproducing system wherein the method of the present invention is used.

Therefore, the read-out conditions may be adjusted so that the maximum light emission amount Smax and the minimum light emission amount Smin calculated as described above correspond to the maximum signal level Qmax and the minimum signal level Qmin determined as mentioned above.

In this case, the read-out conditions are represented by the input-to-output conversion curve in the second quadrant of FIG. 4. Specifically, the read-out conditions are the read-out gain and the scale factor, which may be calculated by the formulae:

$$\text{Scale factor} = k1 \frac{Q\text{max} - Q\text{min}}{S\text{max} - S\text{min}}$$

$$\text{Read-out gain} = f(Sk)$$

Namely, the scale factor represents the inclination of the line indicating the read-out conditions in FIG. 4 (arrow H in the second quadrant in FIG. 4). By changing the scale factor in accordance with the range (Smax−Smin) of the amount of the light emitted by the stimulable phosphor sheet, it is possible to make the range of the level of the input signal to the image processing means always coincide with the range (Qmax−Qmin) of the desired input signal level. In the above-described formula, k1 is a constant for making the range of the unit amount of the emitted light coincide with the range of the unit desired input signal level.

The read-out gain represents the transverse position of the line indicating the read-out conditions in FIG. 4 (arrow I in the second quadrant in FIG. 4). By changing the read-out gain in accordance with the position of the range of the amount of the emitted light, it is possible to make the position of the range of the input signal level always coincide with the position of the range of the desired input signal level. In the above-described formula, the predetermined amount Sk of the emitted light on the histogram is used as a factor for indicating the position of the range of the amount of the emitted light.

When the read-out conditions are adjusted as described above, the input range of the radiation image signal obtained by the final read-out to the image processing means becomes always the same, and image processing becomes easy.

We claim:

1. A method of adjusting radiation image read-out conditions in which preliminary read-out conducted by scanning a stimulable phosphor sheet carrying a radiation image of an object stored therein by stimulating rays of a level lower than the level of the stimulating rays used in final read-out and obtaining a histogram of the amount of the light emitted by the stimulable phosphor sheet is carried out prior to the final read-out wherein the stimulable phosphor sheet is scanned by stimulating rays which cause the stimulable phosphor sheet to emit light in proportion to the radiation energy stored and detecting the emitted light by a photoelectric read-out means to obtain an image signal, and read-out conditions in the final read-out are adjusted on the basis of the histogram obtained by the preliminary read-out,
wherein the improvement comprises adjusting the read-out conditions on the basis of a histogram section ranging from the maximum light emission amount in the histogram obtained by the preliminary read-out to a value offset from said maximum amount by an offset value determined by image recording conditions.

2. A method as defined in claim 1 wherein a value determined by a threshold value is used as said maximum light emission amount.

3. A method as defined in claim 2 wherein said threshold value is approximately 0.1% to 2.0% of the number of picture elements.

4. A method as defined in claim 1 wherein the maximum light emission amount Smax and the minimum light emission amount Smin of a desired image information range are calculated from said histogram section, and the read-out conditions are adjusted on the basis of said maximum light emission amount Smax and said minimum light emisson amount Smin.

5. A method as defined in claim 4 wherein said maximum light emission amount Smax and said minimum light emission amount Smin are calculated by use of threshold values predetermined in accordance with the desired image information range.

6. A method as defined in claim 4 or 5 wherein said read-out conditions include a scale factor which is calculated by $$\text{scale factor} = k1 \frac{Q\text{max} - Q\text{min}}{S\text{max} - S\text{min}}$$

where k1 denotes a constant, Qmax and Qmin denote the maximum signal level and the minimum signal level of a desired input signal range in an image processing means which are determined by the maximum density and the minimum density of a correct density range in a reproduced visible image.

7. A method as defined in claim 4 or 5 wherein said read-out conditions include a read-out gain which is calculated by f(Sk) where Sk denotes the predetermined amount of light emitted by said stimulable phosphor sheet as plotted on said histogram.

8. A method as defined in claim 1, wherein:
for a chest image recording condition, said value determined by said image recording conditions is approximately 1/300 of said maximum amount;
for an abdomen including skin image recording condition, said value determined by said image recording condition is approximately 1/1,000 of said maximum amount; and
for an abdomen excluding skin image recording condition, said value determined by said image recording condition is 1/100 of said maximum amount.

* * * * *